United States Patent [19]

Akatsuka

[11] Patent Number: 5,247,504
[45] Date of Patent: Sep. 21, 1993

[54] INFORMATION RECORDING/REPRODUCING APPARATUS

[75] Inventor: Yuichiro Akatsuka, Tama, Japan

[73] Assignee: Olympus Optical Co., Ltd., Tokyo, Japan

[21] Appl. No.: 764,634

[22] Filed: Sep. 24, 1991

[30] Foreign Application Priority Data

Sep. 28, 1990 [JP] Japan .................................. 2-257186

[51] Int. Cl.$^5$ .............................................. G11B 7/00
[52] U.S. Cl. ................... 369/44.38; 369/44.27
[58] Field of Search ............... 369/44.37, 44.38, 44.41, 369/44.42

[56] References Cited

U.S. PATENT DOCUMENTS

| 4,730,293 | 3/1988 | Pierce et al. | |
| 4,787,076 | 11/1988 | Oeguchi et al. | 369/44.37 |
| 5,033,040 | 7/1991 | Fujita | 369/44.41 |

FOREIGN PATENT DOCUMENTS

| 63-094438 | 4/1988 | Japan | 369/44.38 |
| 2-141932 | 5/1990 | Japan . | |

OTHER PUBLICATIONS

T. Ishida, et al, "High Speed Optical Card Reader/Writer using Two Optical Sources," Central R&D Lab., EFTS Division, Omron Tateisi Electronics Co., pp. 4-265, 1989.

Primary Examiner—Aristotelis Psitos
Assistant Examiner—P. W. Huber
Attorney, Agent, or Firm—Stevens, Davis, Miller & Mosher

[57] ABSTRACT

An information recording/reproducing apparatus having two light sources, one of which is for use in recording information and the other one of which is for use in reproducing information, in which during action when information is recorded on an information recording medium in the apparatus, tracking errors of light beams emitted from the two light sources are corrected with the aid of a tracking error signal detected from reflection light beams of light beams emitted from a light source for use in recording information. Therefore, the light beams spot of the light beam for use in recording information can be positioned at a center portion of a data track without regard to a relative positional relation between the light beam for recording information and the light beam for reproducing information.

9 Claims, 4 Drawing Sheets

INFORMATION RECORDING/REPRODUCING APPARATUS

BACKGROUND OF THE INVENTION

1) Field of the Invention

The present invention relates to an information recording/reproducing apparatus, in which information is recorded or reproduced with the aid of an optical information recording medium such as an optical card. Particularly, the present invention relates to a tracking control technique which can be suitably applied to an information recording/reproducing apparatus having two light sources, one of which is for use in the information recording medium and the other in reproducing information recorded on the medium.

2) Description of the Related Art

In the information recording/reproducing apparatus in which information is recorded on and/or reproduced from the optical information recording medium such as an optical card, an information reading out speed is determined in accordance with a relative moving speed between an optical head provided in the apparatus and the information recording medium. Therefore, when the apparatus is arranged such that a light beam emitted from a light source is illuminated on a single track out of a plurality of tracks formed on the information recording medium to read out information recorded on the relevant track, it is difficult to make the information read out, speed up.

In U.S. Pat. No. 4,730,293, an information recording/reproducing apparatus is disclosed in which a light beam emitted from a light source illuminates a plurality of tracks simultaneously to read out information recorded on the plurality of tracks in a parallel manner, resulting in that the information reading out speed is high. The applicant also suggests a data demodulating system for reading out data recorded in a plurality of data recording areas formed on an information recording medium simultaneously; in Japanese Patent Preliminarily Publication No. Hei2-141932.

Further, in publication "High Speed Optical Card Reader/Writer Using Two Optical Sources" preliminarily documents C-325 of the All Japan Meeting of Telecommunication Society in autumn 1989, an apparatus in which information is recorded/reproduced with a high speed by using an optical head having two optical sources is published. In this apparatus, one of the optical sources is used for recording information on an information recording medium and the other one for reproducing information recorded on the information recording medium.

FIG. 1 is a schematic view showing a construction of an optical head of the apparatus published in the publication. In FIG. 1, a numerical reference 1 denotes a laser diode for emitting a light beam, which is used for recording information; 2 a collimator lens for making the light beam emitted from the laser diode 1 parallel; 3 a polarization beam splitter; 4 an objective lens; 5 an actuator for driving the objective lens; 6 a light emitting diode for emitting a light beam, which is used for reproducing information; 7 a collimator lens for making the light beam emitted from the light emitting diode 6 parallel; 8 an optical card as an optical information recording medium; 9 and 10 mirrors for changing an optical path of a reflection light beam reflected by the optical card 8; 11 an imaginary lens; 12 a beam splitter; 13 a photo detector for detecting a tracking error signal; and a numerical reference 14 represents a photo detector for detecting a focus error signal.

FIG. 2 is a schematic view representing a construction of a signal detecting system in the apparatus shown in FIG. 1 for detecting an information data signal and a tracking error signal. A numerical number 21 represents guide tracks formed on the optical card 8; 22 data pits recorded on data tracks formed between the guide tracks 21 on the optical card 8, information is recorded in the data tracks with the aid of the data pits; 23 a light beam spot of a light beam emitted from the laser diode 1 for recording information; and a numerical number 24 represents a light beam spot of a light beam emitted from the light emitting diode 16 for reproducing information. It should be noted that a numerical number 25 represents a lens system provided in the apparatus and that on the photo detector 13 for detecting the information data signal and the tracking error signal, there are provided light receiving elements 26, 26, which are for reading out information data and light receiving elements 27, 27, which are for detecting the tracking error signal.

As shown in FIG. 2, the light beam spot 23 for recording information and the light beam spots 24 for reproducing information are formed on the optical card 8 with a distance of several ten μm in a track direction, which is parallel to a direction along which the guide tracks 21 are extended, so that it is possible to read out information data directly during writing. In this apparatus, since information can be verified at the same time of writing, an operating time of the system can be shortened to a half.

Further, the light beam for reproducing information illuminates the optical card 8 across over two data tracks in a tracking direction, which is perpendicular to the track direction; and images of two data tracks are formed on the light receiving elements 26, 26 for reading out information. Therefore, in the apparatus, it is possible to read out information formed on the two data tracks which can be read out simultaneously.

On the photo detector 13, between the light receiving elements 26, 26 for reading information data, are used provided the light receiving elements 27, 27 which are for detecting tracking error signal. The tracking control is conducted in the apparatus in such a manner that images formed on an upper area ▽ and a lower area Δ of the light receiving elements 27, 27 are balanced in light and shade. It should be noted that the recording of information is conducted with the aid of a light spot 23 of the light beam emitted from the laser diode 1.

However, in the information recording/reproducing apparatus explained in the above, a tracking control of the light beam for recording during when information is recorded is performed with the aid of a reflection beam of a light beam emitted from the light emitting diode 6, which is used for reproducing information. Therefore, when information is recorded in the data tracks formed on the optical card 8, the relative positional relation between the light beam spot 23 of the light beam emitted from the laser diode 1 and the light beam spots 24 of the light beam emitted from the light emitting diode 6 is important. That is to say, when the relative positional relation between the laser diode 1 and the light emitting diode 6 is varied so that the positions of members, on which these diodes 1 and 6 are provided, are varied due to a temperature variation of an atmosphere around the apparatus, the light beam spot 23 of the light beam emitted from the laser diode 1 would be shifted in upper and lower directions from the relevant guide track.

Generally, the guide tracks are formed on the optical card 8 with a distance of about several μm to ten μm, so that even if an amount of the variation of the relative position of the laser diode 1 and the light emitting diode 6 is very small, i.e. 1 μm-several μm, there is a possibility that the light beam spot of the light beam emitted from the laser diode 1 (hereinafter represented by LD spot) would be shifted from the relevant data track. When the LD spot 23 is sifted from a center of the data track, the recording pit 22 is also formed to be sifted from the center of the data track, of course; in the worst case, when reading out information data, the image of the pit 22 is deviated from the light receiving elements 26, 26 which is used for detecting information data, so information data could not be read out.

Furthermore, according to an accuracy in assembling the optical head, optical axes of light beam for recording information and light beam for reproducing information are sometimes deviated from each other. In such case, since it is necessary to adjust the deviation of the optical axes, the cost for manufacturing the apparatus would be increased and the reliability of the apparatus decreased.

SUMMARY OF THE INVENTION

The present invention has for its object to provide an information recording/reproducing apparatus in which a light beam spot for recording information can be controlled so as to be positioned at a center of a data track during when information data is recorded, even if a relating positional relation between the light beam spot for recording information and the light beam spot for reproducing information is varied.

In order to carry out this object, an information recording/reproducing apparatus according to the present invention comprises:

a first light source for emitting a light beam for recording information on said information recording medium;

a second light source for emitting a light beam for reproducing information recorded on said information recording medium;

an objective lens for making the light beams emitted from said first and second light sources incident upon information recording medium so as to form light beam spots of the light beams on the information recording area of the medium;

a first tracking error detection means for detecting a tracking error signal of the light beams being made incident upon the information recording medium by using the light beam emitted from said first light source;

a second tracking error detection means for detecting the tracking error signal of the light beams being made incident upon the information recording medium by using the light beam emitted from said second light source; and a driving means for driving said objective lens in accordance with an output of said first tracking error detection means or an output of said second tracking error detection means;

whereby during when information is recorded on the information recording medium, a tracking control of the light beams being made incident upon the information recording means being performed in accordance with the tracking error signal detected by said first tracking error detection means.

Additionally, the information recording/reproducing apparatus according to the present invention is characterized in that:

said first light source comprises a laser diode and a diffraction grating; and the light beam emitted form said laser diode is divided into a plurality of light beams by the diffraction grating; whereby information is recorded on the medium with the aid of one of the diffracted light beams and the tracking error signal is detected by said first and second tracking error detecting means with the aid of other beams of the diffracted light beams.

As stated in the above, in the apparatus according to the present invention, the tracking control concerning the light beam spots formed on the optical recording medium is conducted in accordance with a tracking error signal detected by using the light beam for recording information, during when information data is recorded on the information recording medium. Therefore, not only when recording information data but also when reproducing information data at the same time that information data is recorded, the light beam spot of the light beam for recording information can be controlled to be always positioned at a center portion of the relevant data track regardless of the relative positional relation between the light beam for recording information and the light beam for reproducing information.

DESCRIPTION OF THE PREFERRED EMBODIMENT

Figure 1:
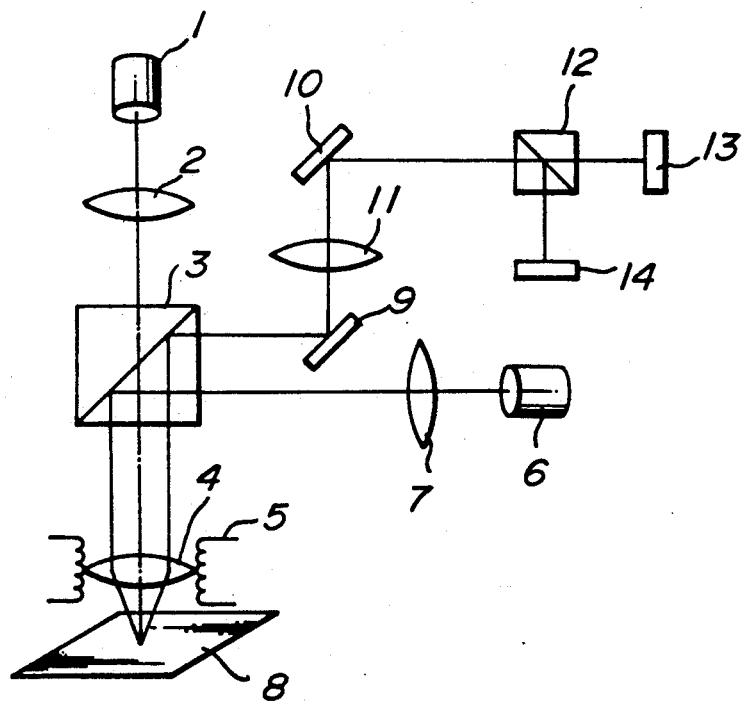
FIG. 1 is a schematic view showing a whole construction of a conventional information recording/reproducing apparatus.
Figure 2:
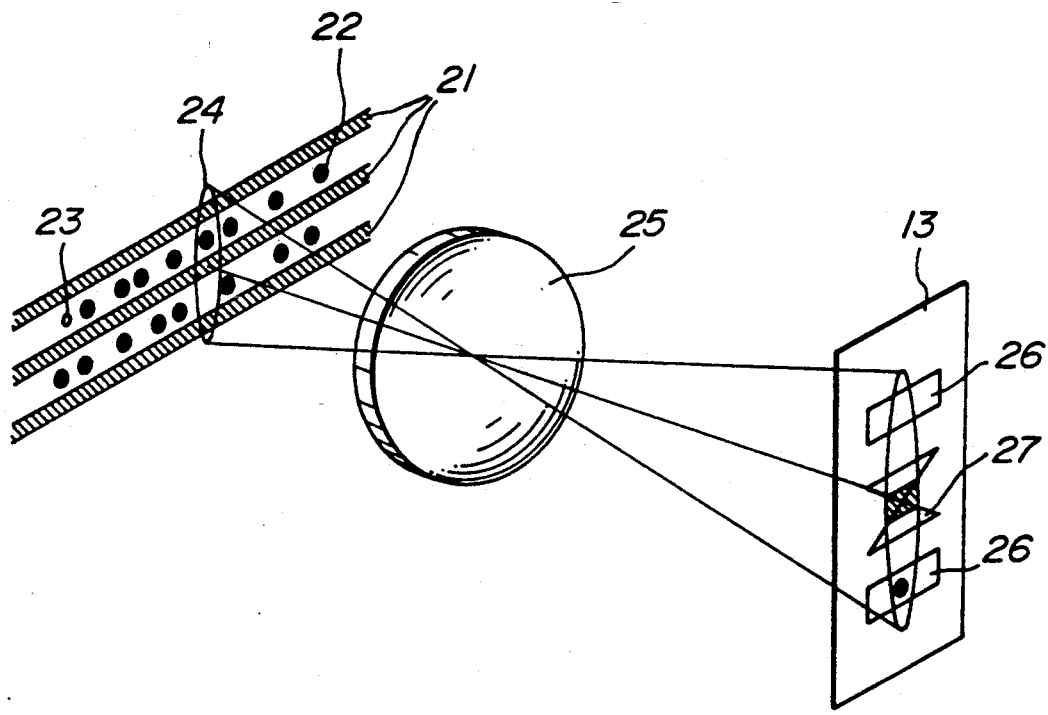
FIG. 2 is a schematic view depicting a construction of a tracking error signal detecting system of the apparatus shown in FIG. 1.
Figure 3:
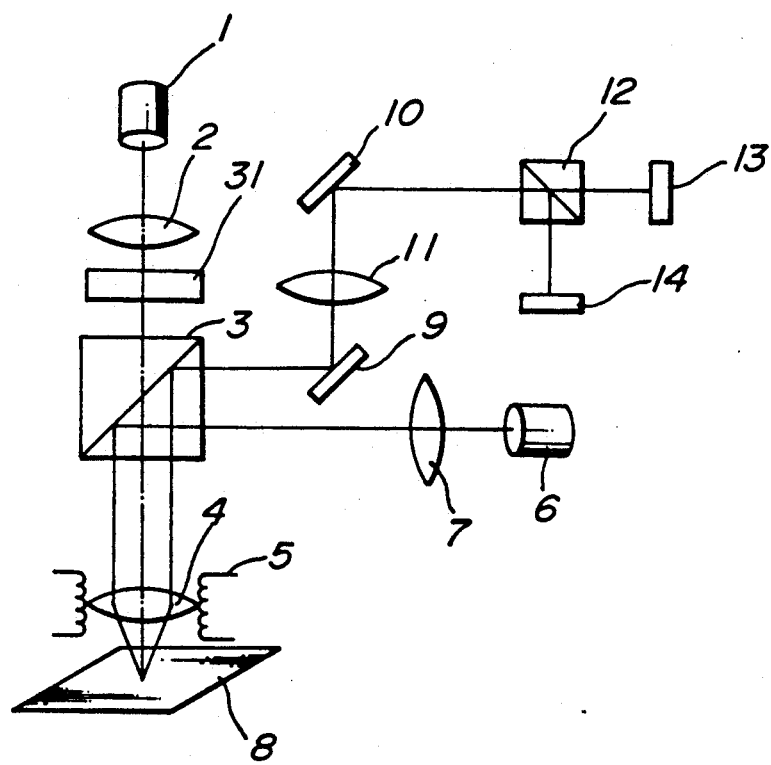
FIG. 3 is a schematic view illustrating a whole construction of an information recording/reproducing apparatus according to an embodiment of the present invention.
Figure 4:
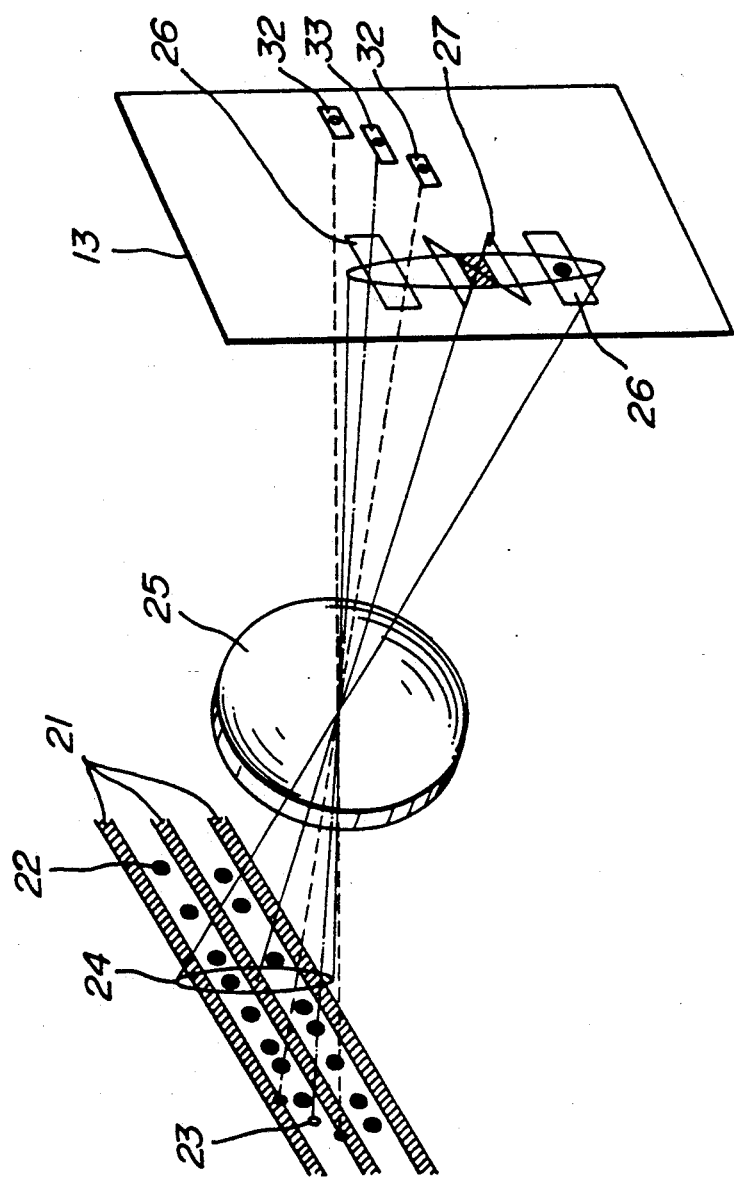
FIG. 4 is a schematic view representing a construction of a tracking error signal detecting system of the apparatus shown in FIG. 3.

FIG. 3 is a schematic view showing a construction of one embodiment of an information recording/reproducing apparatus according to the present invention. In FIG. 3, the same numerical numbers are applied to the same elements of the conventional apparatus shown in FIG. 1, and the explanation therefor is omitted. FIG. 4 is a schematic view showing a construction of data signal and tracking error signal detection system provided in the apparatus shown in FIG. 3.

In the apparatus according to this embodiment, a diffraction grating 31 is arranged between the collimator lens 1 for making the light beam emitted from the laser diode 1 parallel and the polarization beam splitter 3; by the diffraction grating 31 the light beam for recording information emitted from the laser diode 1 is divided into a plurality of light beams. Additionally, as shown in FIG. 4, on the photo detector 13 for detecting the data signal and the tracking error signal, there are provided light receiving elements 32, 32, which are used for detecting a tracking error signal of the light beam for recording information, in addition to the light receiving elements 26, 26 and 27, 27 for reproducing information data and for detecting the tracking error signal of the light beam for reproducing information. The light receiving elements 32, 32 are formed at a position where a reflection light beam of the light beam for recording information is made incident upon. Additionally, there is arranged a light receiving element 33 for detecting a zero-order beam of the light beam for recording information.

The laser beam emitted from the laser diode 1 is made incident upon the diffraction grating 31 via the collimator lens 2 to be diffracted; then the diffracted light beams are made incident upon the optical card 8 via the beam splitter 3 and the objective lens 4. Information is recorded in the data tracks formed on the optical card 8 with the aid of the zero-order light beam out of the diffracted light beams; reflected light beams of ±1st-order light beams reflected by the optical card 8 are made incident upon the light receiving elements 32, 32 arranged on the photo detector 13 to produce a tracking error signal of the light beam for recording information. It should be noted that the tracking error signal of the light beam for recording information is produced by using a three beam method. Outputs of the light receiving elements 32, 32 are supplied to the actuator 5, which is for driving the objective lens 4; then the tracking error of the light beam for recording information is corrected by driving the objective lens 4 in accordance with the outputs of the light receiving elements 32, 32.

In the apparatus according to the embodiment of the present invention, when information recorded on the optical card 8 is reproduced, the tracking error of the light beam for reproducing information is corrected in accordance with outputs of the light receiving elements 27, 27, which are for detecting tracking error signal of the light beam for reproducing information; but the outputs of the light receiving elements 32, 32 for detecting the tracking error signal for recording information are not used. On the other hand, when information is recorded in the data tracks of the optical card 8, the corrections of the tracking error of the light beam for recording information and the light beam for reproducing information are performed in accordance with the outputs of the light receiving elements 32, 32; but the outputs of the light receiving elements 27, 27 are not used. Therefore, even when the optical axes of the light beam for recording information and the light beam for reproducing information are deviated from each other, or the relative position between the light beam for recording information and the light beam for reproducing information is varied by that the assemblings of the two light sources are deviated from each other due to the temperature variation in the atmosphere around the apparatus, the tracking error of the light beam for recording information can be corrected in a correct manner, so that the data pits can be recorded on the center portion of the data tracks.

A switching of signal when the operation mode is changed in the apparatus between recording mode and reproducing mode is performed by an analog switch (not shown). That is to say, by changing the analog switch, an input signals to be supplied to a tracking servo circuit, in which the tracking error signals are supplied to the actuator 5, are switched between the light receiving elements 27, 27 and the light receiving elements 32, 32. In this case, by arranging the light receiving elements 32, 32 of the light beam for recording information and the light receiving elements 27, 27 of the light beam for reproducing information on the same member (photo detector 13), the positional relation between the light receiving elements 32, 32 and the light receiving elements 27, 27 can be kept constant.

As clear from FIG. 4, an area, upon which the light beam for recording information is made incident, on the optical card 8 is small; contrary, the light beam for reproducing information illuminates a larger area of the optical card 8 over across several tracks to several tens of tracks. Therefore, even if the optical axes of these light beams are deviated from each other, it is possible to form the images of the data pits on the light receiving element 26 for receiving the light beam for reproducing information, correcting the tracking error of the light beam for recording information in accordance with the outputs of the light receiving elements 32, 32, by which the reflection light beams of the light beams for recording information are received. Thus, in the apparatus according to the present embodiment, it is possible to reproduce information just after the data pits have been recorded in the data track, so information can be verified easily.

It should be noted that the light receiving element 33 for receiving the zero-order light beam of the diffracted light beams for recording information is not an essential element of the apparatus according to the present invention. However, by arranging the light receiving element 33 on the position where an image of the reflected zero-order light beam is formed, it is possible to monitor the production of the data pits during when the data pits are recorded in the data tracks.

As stated in the above, in the information recording-/reproducing apparatus having two light sources according to the present invention, in which information recorded in a plurality of data tracks can be read out simultaneously and information can be reproduced at the same time that information is recorded, even if the optical axes of the light beam for recording information and the light beam for reproducing information are deviated from each other, it is possible to correct the tracking error of the light beam for recording information so as to from the data pits at the center of the data tracks. Therefore, the reliability of the apparatus can be increased and the cost for adjusting the optical axes of the light beam for recording information and the light beam for reproducing information can be decreased, so the cost for the apparatus as a whole can be decreased.

What is claimed is:

1. An information recording and reproducing apparatus in which information is recorded on and reproduced from an information recording medium by making light beams incident upon an information recording area of the medium, comprising:

a first light source for emitting a light beam for recording information on said information recording medium;

a second light source for emitting a light beam for reproducing information recorded on said information recording medium;

an optical system for making the light beams emitted from said first and second light sources incident upon the information recording medium so as to form light beam spots of the light beams on the information recording area of the medium;

a first tracking error detection means for detecting a tracking error signal of the light beams being made incident upon the information recording medium by using the light beam emitted from said first light source;

a second tracking error detection means for detecting the tracking error signal of the light beams being made incident upon the information recording medium by using the light beam emitted from said second light source; and a driving means for driving an objective lens of said optical system in accordance with an output of either one of said first and second tracking error detection means independently of an output of the other of said first and second tracking error detection means;

whereby during recording, a tracking control of the light beams being made incident upon the information recording means is performed in accordance with the tracking error signal detected by said first tracking error detection means.

2. An information recording and reproducing apparatus according to claim 1, wherein:

said first tracking error detecting means comprises first light receiving elements for receiving a reflection light beam of a light beam emitted from said first light source reflected by the information recording medium; and said second tracking error detecting means comprises second light receiving elements for receiving a reflection light beam of a light beam emitted from said second light source reflected by the information recording medium.

3. An information recording and reproducing apparatus according to claim 2, wherein:

said first and second light receiving elements are formed on a common substrate.

4. An information recording and reproducing apparatus according to claim 1, wherein:

said first light source comprises a laser diode and a diffraction grating; and the light beam emitted from said laser diode is divided into a plurality of light beams by the diffraction grating; whereby information is recorded on the medium with the aid of one of the diffracted light beams and the tracking error signal of the light beams being made incident upon the medium is detected by said first tracking error detecting means with the aid of other beams of the diffracted light beams.

5. An information recording and reproducing apparatus according to claim 4, wherein:

said first tracking error detection means comprises a light receiving element for receiving a reflection light beam of a zero-order light beam emitted from said first light source.

6. An information recording and reproducing apparatus according to claim 1, wherein: a tracking error of the light beam emitted from the second light source is corrected in accordance with outputs of the second tracking error detection means during reproduction.

7. An information recording and reproducing apparatus according to claim 1, wherein a tracking error of the light beam emitted from the first light source is corrected in accordance with outputs of the first tracking error detection means during recording.

8. An information recording and reproducing apparatus according to claim 1, wherein:

said second light source comprises a light emitting diode.

9. An information recording and reproducing apparatus according to claim 1, further comprising:

a switching means for switching an input signal supplied to said driving means between a signal supplied from said first tracking error detection means and a signal supplied from said second tracking error detection means, in accordance with an operational mode in the apparatus.

* * * * *